Figure 1:
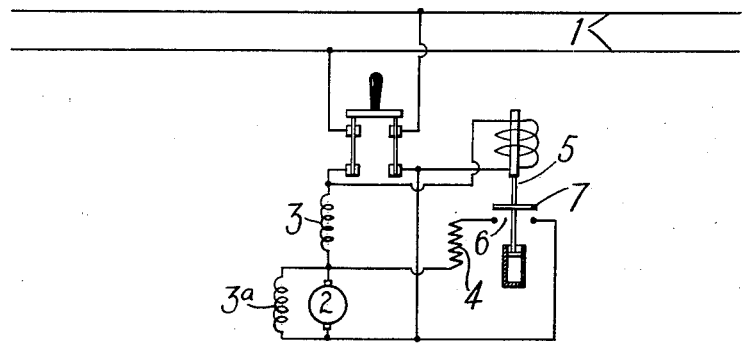

R. E. HELLMUND.
ELECTRICAL APPARATUS.
APPLICATION FILED DEC. 26, 1913. RENEWED OCT. 30, 1917.

1,298,707.

Patented Apr. 1, 1919.

WITNESSES:
A. J. Fitzgerald
W. R. Coles

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL APPARATUS.

1,298,707.     Specification of Letters Patent.     Patented Apr. 1, 1919.

Application filed December 26, 1913, Serial No. 808,719. Renewed October 30, 1917. Serial No. 199,381.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Electrical Apparatus, of which the following is a specification.

My invention relates to electrical apparatus for use with dynamo-electric machines of the commutator type, and it has special reference to means for preventing excessive and injurious sparking or flashing at the commutators of such machines under certain conditions.

The object of my invention is to provide means of the above-indicated character which shall be simple and inexpensive in construction and reliable and effective in operation.

In the prior art, undue sparking or flashing troubles have been experienced in dynamo-electric machines whenever the current has been interrupted and resumed again before the machines have stopped rotating. This difficulty has been particularly frequent and troublesome in the case of railway motors and the like, by reason of the ever-present liability of the trolley wheel leaving the trolley wire for an instant, or by reason of the passage of the wheel under a section break.

The cause of the flashing may be explained as follows: When the current is resumed in a series or compound-wound motor after a sudden interruption, the series field flux does not build up immediately to its normal amount corresponding to the value of the current traversing the series winding by reason of the inductive damping or choking effect in the frame or in the shunt winding of a compound-wound motor, whereas the armature flux builds up rapidly and, consequently, causes undue distortion of the field magnetic flux. The voltage between segments of the commutator is thus increased and sparking or flashing ensues.

Moreover, in the case of compound-wound dynamotors, another peculiar condition has occurred. Upon the interruption of current from the supply-circuit, the machine becomes a momentum-driven generator, by reason of its shunt-winding excitation, and inasmuch as the direction of rotation is not changed, it follows that the current traversing the armature and series field windings is reversed, such current being delivered to the main motors by the dynamotor, which is thus provided with a closed circuit even when the supply-circuit voltage is interrupted. The main field was thus practically demagnetized, even if current was resumed a short time later.

According to my present invention, I provide simple and effective means for obviating the above-mentioned difficulties, comprising, in one aspect, a resistance or other suitable translating device which is automatically connected in parallel-circuit relation to the armature winding upon a sudden interruption of the current and which is automatically disconnected therefrom when normal operating conditions have been reëstablished. In another aspect, my invention comprises automatic means for connecting in circuit a number of extra field winding turns, upon the current interruption, and for disconnecting the extra turns, upon the resumption of normal conditions.

In the first case, the armature current is kept down sufficiently to prevent a predominance thereof over the simultaneous field current; and, in the second case, the extra field turns will assist in rapidly building up the proper field magnetic flux, whereby, in both cases, the probability of serious sparking or flashing is rendered extremely remote.

In still another aspect, my invention embraces the use, in a compound-wound machine, of a differentially-connected series field winding, that is, a winding connected to act in opposition to the shunt field winding, which is designed correspondingly. In this case, the above-mentioned current reversal in the armature and series field windings will tend to temporarily strengthen the field flux, so that when the supply-circuit current is applied again, a strong field is already established and, consequently, field distortion and poor commutating conditions, such as sparking or flashing, are substantially prevented.

Figure 2:
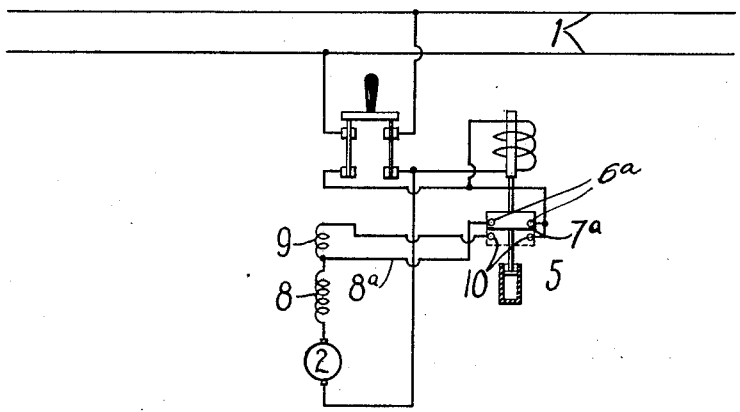
Figure 3:
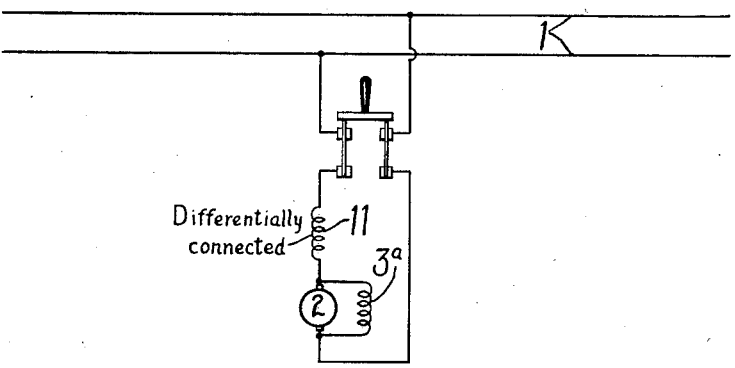

In the accompanying drawings, Figure 1 is a diagrammatic view of an electrical system embodying my invention, and Figs. 2 and 3 are similar views showing modifications thereof.

Referring to Fig. 1 of the drawings, the system here shown comprises a supply-circuit 1, a suitable dynamo-electric machine fed therefrom and having an armature winding 2, a series field winding 3 and, optionally, a shunt field winding 3ª, a suitable translating device 4 for connection across the armature winding 1 under predetermined conditions, and an electro-responsive device 5 for automatically opening or closing the circuit of the translating device 4.

The translating device 4 may constitute a suitable resistor or any other apparatus capable of performing similar functions, and is connected across the armature winding 1 through a normally open gap 6. The electro-responsive device 5 is connected to the supply-circuit 1 and is preferably a switch of the time-limit type and of any well-known construction that carries a movable contact member 7 to bridge the gap 6 and complete the circuit of the translating device 4 under predetermined conditions, as hereinafter described.

In Fig. 2, the dynamo-electric machine is shown as having a two-part series field winding, one part 8 of which is normally connected in the machine circuit through an intermediate field tap 8ª and stationary contact members 6ª which are bridged by a contact member 7ª. The other part 9, preferably of fewer turns, is normally inoperative and has its free end connected to one of two terminal members 10, which are adapted to make exclusive connection with the contact member 7ª under predetermined conditions, as hereinafter set forth. The member 7ª is sufficiently wide to simultaneously bridge both sets of contact members 6ª and 10, thereby preventing any opening of the circuit during the transition.

Reference may now be had to Fig. 3, which discloses a dynamo-electric machine having the armature winding 2, a shunt field winding 3ª, and a differentially-connected series winding 11, for a purpose hereinbefore specified.

Assuming that the machine is operating under normal conditions, the operation of the apparatus of Fig. 1 may be described as follows: If, for any reason, the supply current should be cut off from the machine, the electro-responsive device 5 becomes deënergized, whereby the contact member 7 bridges the gap 6 and the translating device 4 is connected across the armature winding, the circuit remaining closed, by reason of the weight of the contact member 7, so long as the current remains off. When the current is resumed, which occurs without undue sparking or flashing on the commutator, for reasons hereinbefore specified, the circuit of the translating device 4 is not opened until a predetermined time has passed, in accordance with the well-known principle of the time-limit switch. By the time the circuit is opened, normal machine-operating conditions will have been resumed. It will be noted that the electro-responsive device 5 is again in position to act whenever necessary.

The operation of the apparatus shown in Fig. 2 is similar to that just described. Whenever the electro-responsive device 5 becomes deënergized, the contact member 7ª drops to its lower position, shown in dotted lines, without opening the circuit during the transition. In this position, both portions 8 and 9 of the series field winding are included in the machine circuit, and remain there until a predetermined time after current has been resumed, in accordance with the setting of the time-limit switch. The electro-responsive device 5 then reassumes the position shown in full lines in the drawing. The advantages of this operation have already been pointed out.

The operation of the machine shown in Fig. 3, upon interruption and subsequent resumption of supply-circuit current, is believed to have been already sufficiently explained.

I do not wish to be restricted to the specific circuit connections or structural details herein set forth, as modifications thereof may be made within the spirit and scope of my invention; I, therefore, desire that only such limitations shall be imposed as are indicated in the appended claims.

I claim as my invention:

1. The combination with a compound-wound dynamo-electric machine having an armature winding and a main and a shunt field winding, of a translating device and means dependent upon an interruption of current for connecting said device in parallel with the armature winding and in series with the main field winding upon resumption of current.

2. The combination with a supply circuit and a dynamo-electric machine having armature and field windings, of an auxiliary circuit having a translating device therein and a relay connected across said supply circuit and dependent upon an interruption of current for connecting the auxiliary circuit in shunt to said armature winding upon a resumption of current.

3. The combination with a dynamo-electric machine having an armature winding and a series and a shunt field winding, of a translating device and means dependent upon an interruption of current for connecting said device in parallel with the armature winding to effect substantially normal flux relations between the armature and the field windings upon a resumption of current.

4. The combination with a supply circuit and a dynamo-electric machine having armature and field windings, of means connected across the supply circuit and dependent upon an interruption of current for temporarily changing the connections of a portion of the machine circuit to maintain substantially normal flux relations between said armature and said field windings upon the resumption of current, and for automatically reverting to the original connections under predetermined subsequent conditions.

5. The combination with a dynamo-electric machine having an armature winding and a series and a shunt field winding, of a translating device and means dependent upon an interruption of current for temporarily placing said translating device in circuit with said machine to prevent an armature flux abnormally disproportionate to the simultaneous field magnetic flux upon the resumption of current, and means including said first means for automatically reverting to the original connections a predetermined time interval after the resumption of current, whereby sparking is prevented.

6. The combination with a supply circuit and a dynamo-electric machine having an armature winding, of a translating device and means connected across the supply circuit and dependent upon an interruption of current for inserting said device in shunt circuit relation to the armature winding of said machine upon a resumption of current and for disconnecting said device under predetermined subsequent conditions.

7. The combination with a dynamo-electric machine, of a translating device, means connected across the supply circuit and dependent upon an interruption of current for inserting said device in parallel circuit relation with a portion of said machine upon a resumption of current and means including said first means for disconnecting said device under predetermined subsequent conditions.

8. The combination with a dynamo-electric machine, of a supply circuit therefor, a translating device, electro-responsive means dependent upon an interruption of current from said supply circuit for inserting said device in circuit relation with the armature winding of said machine, and means including said first means for disconnecting said device after the resumption of current.

9. The combination with a dynamo-electric machine, of a supply circuit therefor, a translating device, electro-responsive means dependent upon an interruption of current from said supply circuit for inserting said device in parallel relation with the armature winding of said machine upon a resumption of current, and means associated with said first means for retarding the disconnection of said device after the resumption of current.

10. The combination with a dynamo-electric machine, of a supply circuit therefor, a translating device, electro-responsive means connected across the supply circuit and dependent upon an interruption of current from said supply circuit for inserting said device in parallel relation with the armature winding of said machine upon a resumption of current, and means associated with said first means for adjusting the time of disconnection of said device after the resumption of current.

11. The combination with a compound-wound dynamo-electric machine having an armature winding, of means dependent upon an interruption of current and connected in shunt to said machine winding upon a resumption of current for temporarily reducing the armature flux, whereby sparking is prevented.

12. The combination with a supply circuit and a dynamo-electric machine having an armature and a field winding, of means for automatically modifying the circuit conditions after an interruption of the operative relations between said machine and said supply circuit to strengthen the field winding substantially concurrently with the resumption of said operative relations.

13. The combination with a supply circuit and a dynamo-electric machine having an armature and a field winding, of means for varying the field-winding strength substantially concurrently with a resumption of operative relations between said machine and said supply-circuit without modifying the field-winding connections.

In testimony whereof, I have hereunto subscribed my name this 18th day of Dec., 1913.

RUDOLF E. HELLMUND.

Witnesses:
JOHN S. DEAN,
B. B. HINES.